United States Patent
Hoeferlin et al.

(10) Patent No.: US 12,165,388 B2
(45) Date of Patent: Dec. 10, 2024

(54) METHOD FOR TREATING PLANTS IN A FIELD

(71) Applicant: Robert Bosch GmbH, Stuttgart (DE)

(72) Inventors: Markus Hoeferlin, Simmozheim (DE); Maurice Gohlke, Stuttgart (DE); Sandra Amend, Chilliwack (CA); Daniel Di Marco, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 17/756,198

(22) PCT Filed: Nov. 20, 2020

(86) PCT No.: PCT/EP2020/082822
§ 371 (c)(1),
(2) Date: May 19, 2022

(87) PCT Pub. No.: WO2021/105014
PCT Pub. Date: Jun. 3, 2021

(65) Prior Publication Data
US 2022/0406039 A1    Dec. 22, 2022

(30) Foreign Application Priority Data
Nov. 25, 2019    (DE) .................... 10 2019 218 186.4

(51) Int. Cl.
*G06V 10/00*    (2022.01)
*G06T 1/00*    (2006.01)
(Continued)

(52) U.S. Cl.
CPC .......... *G06V 10/774* (2022.01); *G06T 1/0014* (2013.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 2017/0172077 A1* | 6/2017 | Wouhaybi | A01G 25/16 |
| 2019/0114481 A1 | 4/2019 | DeChant et al. | |

(Continued)

FOREIGN PATENT DOCUMENTS

| | | |
|---|---|---|
| DE | 10 2017 217 258 A1 | 3/2019 |
| WO | 2017/194399 A1 | 11/2017 |
| WO | 2019/215582 A1 | 11/2019 |

OTHER PUBLICATIONS

International Search Report corresponding to PCT Application No. PCT/EP20120/082822, mailed Feb. 15, 2021 (German and English language document) (6 pages).

(Continued)

*Primary Examiner* — Eric A. Rust
(74) *Attorney, Agent, or Firm* — Maginot, Moore & Beck LLP

(57) ABSTRACT

A method for treating plants in a field, in which a specific crop is planted, has the following steps: selecting a treatment tool for treating plants; capturing an image of the field, the image being correlated with positional information; determining a position of a plant to be treated in a field, using a neural network into which the captured image is fed, wherein the neural network has multiple specific classes and a general class, the crop belongs to one of the specific classes, and plants not corresponding to the crop belong to both one of the specific classes and to the general class, or at least belong to the general class; directing the treatment tool to the position of the plant; and treating the plant using the treatment tool.

10 Claims, 2 Drawing Sheets

(51) Int. Cl.
    *G06T 7/73*     (2017.01)
    *G06V 10/764*     (2022.01)
    *G06V 10/774*     (2022.01)
    *G06V 20/00*     (2022.01)
    *G06V 20/68*     (2022.01)
    *A01M 7/00*     (2006.01)
    *G06V 10/82*     (2022.01)

(52) U.S. Cl.
    CPC ............ *G06V 10/764* (2022.01); *G06V 20/68* (2022.01); *A01M 7/0089* (2013.01); *G06T 2207/20084* (2013.01); *G06V 10/82* (2022.01)

(56) References Cited

U.S. PATENT DOCUMENTS

| | | |
|---|---|---|
| 2019/0239502 A1 | 8/2019 | Palomares et al. |
| 2021/0055099 A1* | 2/2021 | Walther ................ A01D 75/00 |

OTHER PUBLICATIONS

J. Long, et al., "Fully convolutional networks for semantic segmentation", Computer Vision and Pattern Recognition, IEEE, 2015, pp. 3431-3440.

S. Jegou, "The one hundred layers tiramisu: Fully convolutional densenets for semantic segmentation", Computer Vision and Pattern Recognition Workshops, IEEE, 2017, pp. 11-19.

Knoll Florian J et al. "CPU architecture for a fast and energy-saving calculation of convolution neural networks", Proceedings of SPI; [Proceedings of SPIE ISSN 0277-786X, vol. 10524], SPIE, US, vol. 10335, Jun. 26, 2017 (Jun. 26, 2017), pp. 103351M-103351M, DOI: 10.1117/12.2270282, ISBN: 978-1-5106-1533-5. XP060092216, p. 3, paragraph 6-pp. 3, paragraph 8; figure 3.

* cited by examiner

METHOD FOR TREATING PLANTS IN A FIELD

This application is a 35 U.S.C. § 371 National Stage Application of PCT/EP2020/082822, filed on Nov. 20, 2020, which claims the benefit of priority to Serial No. DE 10 2019 218 186.4, filed on Nov. 25, 2019 in Germany, the disclosures of which are incorporated herein by reference in their entirety.

BACKGROUND

The present disclosure relates to a method for processing plants in a field.

Among the diverse tasks in agriculture, weed control is of central importance for success in terms of yield. The costs for pesticides are considerable and the effects thereof on the environment are problematic. Therefore, use is increasingly being made of autonomously working systems for processing plants, i.e. useful plants and weeds. In this case, the processing can be effected mechanically, e.g. by a rotary tiller, but also by targeted application of pesticides, e.g. by a controlled sprayer. In this way the use of pesticides can be avoided or at least reduced, as a result of which the influence on the environment and also the expenditure in terms of costs are reduced.

For selective (the plant to be processed is distinguished from other plants and the soil) plant processing in a field, it is necessary for the position of a plant to be processed in a field to be recognized exactly. This can be accomplished by various object recognition methods, optical image recognition using a classifier being used in particular. In this case, a semantic segmentation of a captured image, but also a classification of the image can be carried out.

In practice, use is made of vehicles or apparatuses for processing plants in fields in which a specific type of useful plant is grown and a multiplicity of different weeds grow.

For the classification of plants in a field, an obvious approach here is to use a classifier which enables at least a differentiation between the cultivated useful plant (e.g. sugar beet) and the weeds growing in the field. However, if the classifier is intended to be used in a field in which a different type of useful plant (e.g. maize) is grown, this procedure has the disadvantage that annotated training data for this field have to be available or need to be newly acquired. Afterward, the classifier has to be trained anew (e.g. a sugar beet is a weed in the maize field) or a further classifier has to be added, which is trained with the new training data. This procedure for classification is referred to as a one-vs.-other procedure since one particular type of useful plant is differentiated from a multiplicity of weeds.

If an apparatus is intended to be used in different fields in which different useful plants are grown, it is more efficient for this reason to define the individual types of weeds and useful plants as a separate class, such that e.g. a type-specific classification of plants is possible. In this case, the classifier has a multiplicity of classes, such that the plants in a field can thus be recognized in a type-specific manner. This procedure is referred to as an all-vs.-all procedure. In the case of this procedure, it is thus possible for the classifier to be usable in a plurality of fields in which different useful plants are grown, since a separate class is in each case defined for each type of useful plant.

During a processing process, however, the situation may occur that unknown plants or plants which are not defined in the classifier or are not recognized by the classifier are present, or that a classification result output by the classifier is not sufficiently accurate on account of varying environmental conditions (e.g. different types of soil, different seeds with different genetics, nutrient-dictated growth differences, etc.). However, these variations or unknown plants that are not present in the training data are intended to be subsequently trained directly in the field with as little complexity as possible, such that an accurate differentiation between the plants to be processed and the plants not to be processed is still possible.

In this case, it would be an obvious solution to capture images of the unknown plant, to annotate these images with ground truth in order to generate new training data, and then to train the classifier with the newly generated training data. However, this procedure is associated with a high complexity and therefore cannot be realized efficiently in practice. Furthermore, in fields with a high degree of plant cover, it is virtually impossible to specify each plant exactly in order to annotate it in the new training data.

Therefore, it is an object of the present disclosure to provide a method for processing plants in a field which can be adapted in the field in a simple manner.

SUMMARY

Figure 1:
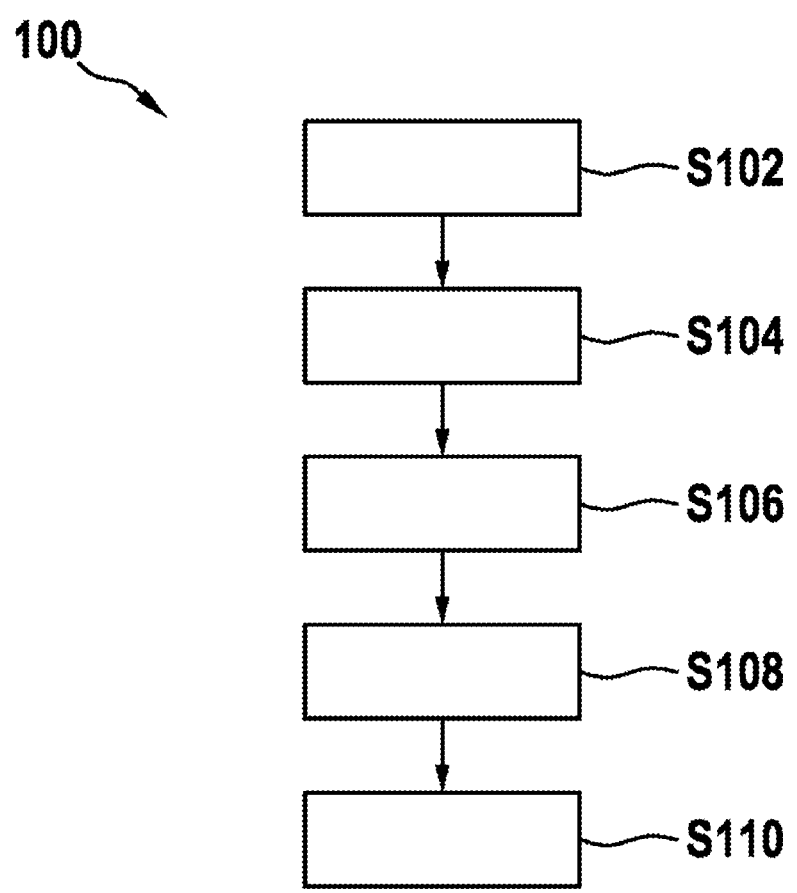
FIG. 1 shows a flow diagram of the method according to the disclosure.

Embodiments of the present disclosure are described below with reference to the accompanying figures.

DETAILED DESCRIPTION

A vehicle to which an apparatus for processing plants is attached traverses a field along a predefined route and the objects or plants to be processed are individually processed successively by the method 100 according to the disclosure being carried out. In this case, the vehicle traverses the field autonomously, but can also traverse the field in accordance with control by an operator.

A field can be understood to mean a delimited area of land for growing useful plants or else a portion of such a field. A useful plant is understood to mean an agriculturally used plant which is used itself or the fruit of which is used, e.g. as foodstuff, feedstuff or as energy crop. The seeds and thus the plants are primarily arranged in rows, in which case objects may be present between the rows and also between the individual plants within a row. The objects are undesired, however, since they reduce the yield of the plants or constitute a disturbing influence during cultivation and/or harvest. An object can be understood to mean any plant that is different than the useful plant, or any article. Objects may be, in particular, weeds, pieces of wood and stones.

For this purpose, the apparatus for processing plants has at least the following elements: a processing tool, an image capturing means, various sensor elements (e.g. a position sensor, a speed sensor, an inclination sensor, a distance sensor etc.), a storage unit and a computing unit.

The apparatus for processing plants is installed on a vehicle provided therefor, which vehicle is operated by a battery but can also be operated by some other energy source, such as an internal combustion engine, for instance. Furthermore, the apparatus can also be attached to an agricultural vehicle or a trailer for the agricultural vehicle. In this case, the apparatus is operated by an energy source of the vehicle but can also be operated by a separate energy source provided therefor.

The processing tool is a mechanical tool which is attached to a movable apparatus, such that it can be guided toward or away from a plant to be processed, and is configured such that a plant is processed thereby. The movable apparatus is for example an arm with joints which is moved by electric motors or a hydraulic system. The processing tool is e.g. a rotary tiller that severs the plant, i.e. a weed in this case, in the region of the roots. However, the processing tool can also be a sprayer that sprays a pesticide in the direction of a plant to be processed. It should be noted that the sprayer can also be used for applying a crop protection agent or fertilizer to a useful plant. Furthermore, even further processing tools, such as, for instance, an electric processing tool, a laser, microwaves, hot water or oil, are conceivable. In this case, the processing tool installed on the vehicle has a specific spatial accuracy. The spatial accuracy in the case of a rotary tiller is dependent on the movable apparatus and the mechanical configuration (e.g. the diameter) of the rotary tiller itself. The spatial accuracy in the case of a sprayer is dependent on a nozzle angle of the sprayer. In this case, the spatial accuracy in the case of a sprayer is lower than that in the case of a rotary tiller by a multiple. Furthermore, it is also possible for a plurality of processing tools to be attached to an apparatus for processing plants, which processing tools can be operated simultaneously. It is also possible for different types of processing tools to be attached to the same apparatus for processing plants.

The image capturing means is a camera, such as e.g. a CCD camera, a CMOS camera, etc., which captures an image in the visible range and provides it as RGB values or as values in some other color space. However, the image capturing means can also be a camera that captures an image in the infrared range. An image in the infrared range is particularly suitable for capturing plants since a reflection of the plants is significantly increased in this frequency range. However, the image capturing means can also be e.g. a mono, RGB, multispectral, hyperspectral camera. The image capturing means can also provide a depth measurement, e.g. by means of a stereo camera, a time-of-flight camera, etc. It is possible for a plurality of image capturing means to be present, and for the images to be captured by the different image capturing means and also the data to be acquired by the various sensor elements substantially synchronously.

The operation of the apparatus for processing plants requires further data, which are acquired using various sensor elements. In this case, the sensor elements can comprise a position sensor, e.g. GPS, high-accuracy GPS, etc., a speed sensor, an inclination sensor, a distance sensor, but also other sensors, such as, for instance, a weather sensor, etc.

The storage unit is a non-volatile physical storage medium, such as a semiconductor memory, for example, in which data can be stored for a relatively long time. The data remain stored in the storage unit even when no operating voltage is present at the storage unit. The storage unit stores a program for carrying out the method according to the disclosure and operating data required therefor. Moreover, the images captured by the image capturing means and the data acquired by the sensor elements are stored on the storage unit. However, other data and information can also be stored in the storage unit.

The program stored in the storage unit contains instructions in the form of program code written in an arbitrary programming language, said instructions being executed in sequence so that the method 100 according to the disclosure for processing the plants in the field is carried out. In this case, the program can also be divided into a plurality of files having a predefined relation to one another.

The computing unit is an arithmetic logic unit that is implemented in the form of a processor (e.g. CPU, GPU, TPU). The computing unit is able to read data from the storage unit and to output instructions according to the program in order to control the image capturing means, the sensor elements and actuators, such as the processing tool, for instance, which are all connected to the computing unit communicatively (in a wired or wireless manner).

During a traversal, the individual method steps S102 to S110 of the method 100 according to the disclosure, as shown in FIG. 1, are carried out in sequence. The individual steps are described in detail below:

Initially, in step S102, the processing tool is selected which is intended to process the plants or objects in a field. In this case, as described above, the spatial accuracy with which the plants are processed by the processing tool is dependent on the type of processing tool. The processing tool can be defined for the entire duration of the traversal before the traversal of the field starts. However, the processing tool can also be changed during a traversal.

Afterward, in step S104, an image 12 of the field in which the plants are growing is captured by the image capturing means. The image capturing means is attached to the vehicle in such a way that an image sensor is substantially parallel to a surface of the ground of the field. Moreover, position information about the position at which the image 12 is captured in the field is obtained substantially synchronously with the capturing of the image 12. The position information obtained by the position sensor is correlated with the image 12, such that actual positions of pixels of the image 12 in the field can be determined taking account of the position information, the image angle of the image capturing means used and the distance between the image capturing means and the ground. However, the image capturing means can also be attached in such a way that the image sensor is inclined in an arbitrary direction in order to capture a larger region of the field. In this case, the inclination angle is to be taken into account when determining the position of a pixel in the field.

In the subsequent step S106, the captured image 12 is processed in order to determine a position of the plant to be processed in the field. In this case, the positions of the plants to be processed are determined individually by information about the represented content being allocated to the pixels of the captured image 12. Since the position of the individual pixels in the field is known, the respective positions of the plants to be processed can be determined. In this case, the position of a plant in a field is preferably determined by means of a semantic segmentation of the captured image 12 correlated with the position information. The semantic segmentation, in which each pixel of an image 12 is classified individually, is obtained by employing a so-called fully convolutional DenseNet. However, a semantic segmentation can also be obtained by a fully convolutional neural network or some other suitable neural network. Methods for the pixel-by-pixel semantic segmentation of images are known in the prior art from the following documents: Long, J., Shelhamer, E., & Darrell, T. (2015), "Fully convolutional networks for semantic segmentation". In Proceedings of the IEEE conference on computer vision and pattern recognition (pages 3431-3440). Jégou, S., Drozdzal, M., Vazquez, D., Romero, A., & Bengio, Y. (2017). "The one hundred layers tiramisu: Fully convolutional densenets for semantic segmentation". In Proceedings of the IEEE Conference on Computer Vision and Pattern Recognition Workshops (pages 11-19). Furthermore, it should be noted that regions, so-called superpixels, in the image 12 can also be semantically segmented. Furthermore, the position of the plant to be processed can be determined by means of a classification of the image 12 or some other known method for object recognition in which a neural network is used. Hereinafter, both the semantic segmentation of the pixels or superpixels and the classification of the image are referred to as classification, for simplification.

As already mentioned, a respective position of the plants to be processed in the field is determined using a neural network 10.

The problem of distinguishing a specific plant to be processed (in most cases the useful plant growing in the field) from other plants (usually weeds) can be tackled by means of the all-vs.-all procedure. In this case, this procedure affords the advantage that a plurality of specific classes 14 to 17 are defined. In addition, it is possible to define different classes for useful plants, e.g. 14 for maize and 15 for sugar beet, only one of these classes being stipulated as useful plant according to the field in which the processing is effected. The neural network 10 is thus usable in a flexible manner in fields with different useful plants.

Furthermore, any arbitrary class, e.g. 16, of the neural network 10 can be stipulated as plant type to be processed. It goes without saying that it is also possible for a plurality of plant classes, e.g. 16 and 17, to be stipulated as plant type to be processed. In the case where fertilizer is applied by the sprayer, for example, the class of the useful plant, e.g. 14 in a maize field, is stipulated as the plant to be processed. If a herbicide that is effective for dicotyledonous plants is to be applied, accordingly only dicotyledonous weeds are stipulated as the plants to be processed. In the case of mechanical processing by the rotary tiller, all plants with the exception of the useful plant are stipulated as the plants to be processed.

Figure 2:
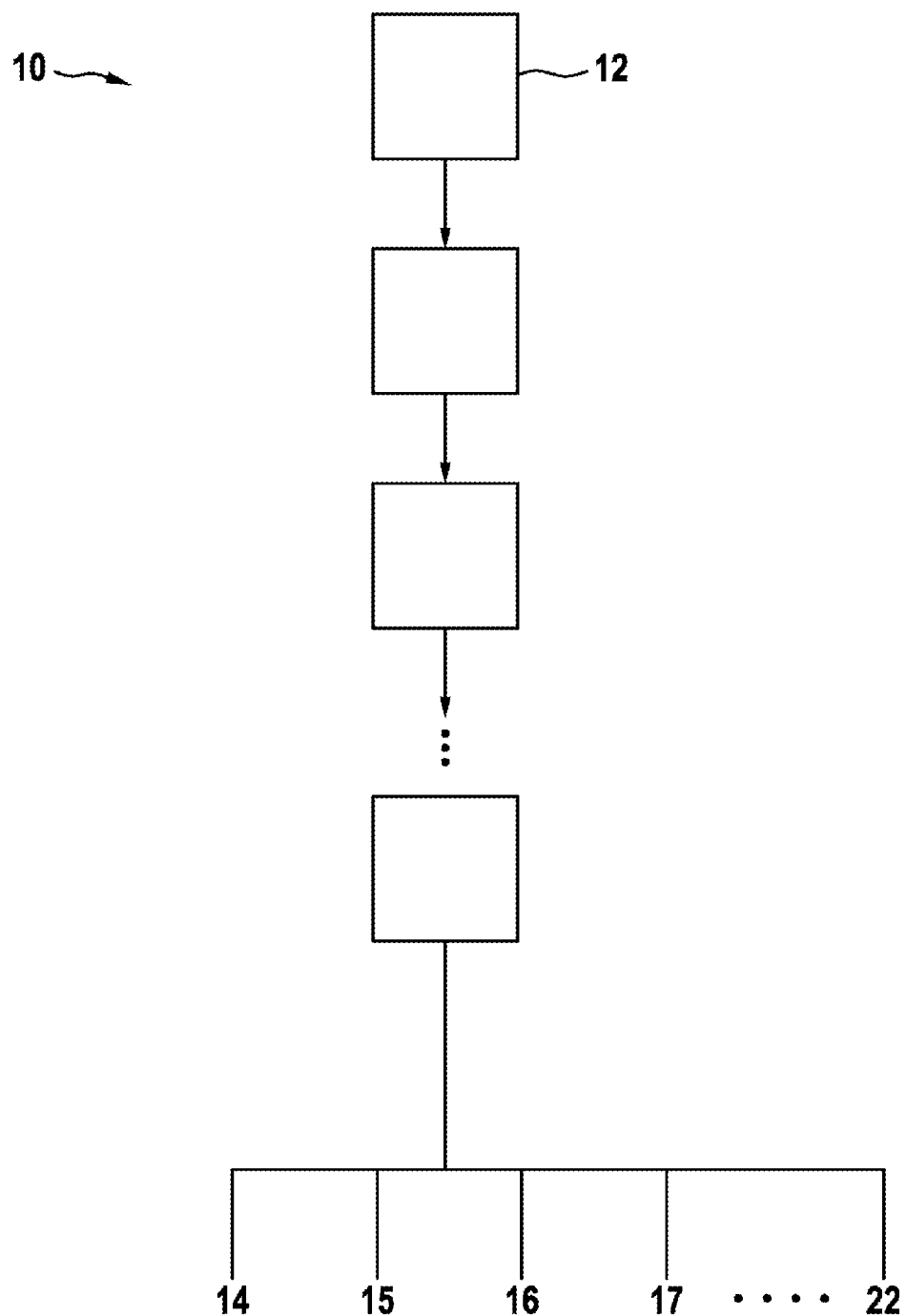
FIG. 2 shows a neural network for determining a position of a plant in a field.

As already explained in the introduction, in the case where the all-vs.-all procedure is applied, the situation may appear, however, that an unknown plant (usually a weed since the useful plant growing in the field should be known) is not classifiable by the neural network 10. In order that unknown plants can nevertheless be classified in the case where the all-vs.-all procedure is applied, they are combined in a general class 22, such that a combination with the one-vs.-other procedure is generated. Consequently, in addition to the specific classes 14 to 17, the neural network 10 has at least one general class 22, which usually comprises a higher hierarchical level. In this case, the general class 22 can be the very general class of weeds, but is not limited thereto, and can e.g. also comprise dicotyledonous or monocotyledonous plants. Furthermore, it is also possible for a plurality of more general classes to be defined (e.g. both dicotyledonous and monocotyledonous plants). In FIG. 2, the reference sign 22 is allocated to the general class by way of example. It should be noted in this respect that the classes of the neural network is not limited to this number of classes.

In the concrete case shown in FIG. 2, the general class 22 is defined for weeds, i.e. all plants that do not correspond to the useful plant. The neural network 10 according to the disclosure is thus able to differentiate the useful plant not only from the individual weed types for which a separate class is defined, but also from all other weeds for which no class is defined and which is not annotated in the ground truth with which the neural network 10 was initially trained.

The neural network 10 according to the disclosure thus affords the advantage that even unknown weeds can be classified and then processed if appropriate. Subsequent training of the neural network 10 will be described in a later section.

Furthermore, the neural network 10 according to the disclosure is configured as a multi-label classifier, such that plants can belong to more than one class. A plant can thus belong both to one of the specific classes 14 to 17 and to the general class 22. However, this multiple classification (e.g. to the classes 16 and 22) should be taken into account during use of the neural network 10 according to the disclosure and can be resolved by a plant being classified as associated with the class (e.g. class 16) for which the maximum confidence is attained.

If it is established that the plants to be processed in the field are processed only inadequately since many plants in the field are unknown or a high degree of variation is present, the neural network 10 has to be adapted to the changed conditions. Since the neural network 10 according to the disclosure has the general class 22, subsequent training can be effected in a simple manner.

For this purpose, new training data are generated for the relevant field by images being captured in a region of the field in which no useful plants are growing, such that exclusively weeds are present in the images. A region at the edge of the field can be captured for this purpose. If the individual rows of the field in which the useful plants have been sown are known, it is also possible to capture images in a region between the rows. Afterward, in these images all plants are segmented from the soil and annotated as being associated with the general class 22. If the neural network 10 yields a reliable classification result for the useful plant, it is also possible to record images of a region in which useful plants are growing. In this case, the recognized useful plants are correspondingly annotated in the images and all other plants are automatically annotated as being associated with the general class 22. Subsequent training of the neural network 10 can be effected with these data, as described further below.

A method for training the neural network 10 according to the disclosure is described below. A cost function of the errors which are caused during the classification is usually minimized during the training of neural networks. During the initial training of the neural network 10 according to the disclosure, however, the cost function is adapted such that no costs are generated for the case where a plant which does not correspond to the useful plant and for which a specific class (e.g. 16) is defined is classified as being associated with the general class 22. In addition, the training data with which the neural network 10 is initially trained are adapted such that weeds are also always annotated as being associated with the general class 22. Consequently, in the initial training data weeds have a plurality of annotations (i.e. type of weed, e.g. 16, and general class weed 22).

If the neural network 10 is then intended to be subsequently trained in the field, the training data, as described above, are merely annotated as being associated with the general class 22. In this case, the cost function is adapted such that no error costs are generated if a plant which belongs to the general class 22 is classified as being associated with one of the specific classes 15 to 17. The neural network 10 according to the disclosure thus affords the advantage that subsequent training with new training data can be effected in a simple manner. In addition, new training data can be generated without exact and type-specific annotation of the unknown plants since they are annotated as being associated with the general class 22. Accordingly, subsequent training of the neural network 10 is possible in the field without a high degree of complexity.

The neural network 10 according to the disclosure thus affords the advantage that it can be subsequently trained rapidly and efficiently if an insufficiently accurate classification is established during processing in the field. In addition, the neural network 10 according to the disclosure can be used for the classification of plants in fields with different useful plants since a separate specific class is in each case defined for these.

After the position of the plant to be processed in the field has been determined in step S106 using the neural network according to the disclosure, in step S108 the selected processing tool can be guided to the position of the plant and the corresponding processing can be carried out for the individual plant. In this case, a mechanical tool can be accurately guided right up to the position of the plant or the sprayer, for applying the pesticide, crop protection agent or fertilizer, can be guided to a position at a predefined distance from the weed or the useful plant and can be directed at the latter. In order to enable an exact control of the movable apparatus, it may be necessary here for the position of the plant ascertained by means of the image to be converted into the coordinate system of the movable apparatus. A speed at which the vehicle moves forward should additionally be taken into account when guiding the processing tool.

Afterward, in step S110, the plant is processed by the processing tool. In this case, by means of the use of the mechanical tool, the plant is removed, chopped or destroyed or sprayed with the pesticide, crop protection agent or fertilizer. As a result of the mechanical processing of the plants or the targeted application of chemical substances, the amount of chemical substances applied in conventional methods can thus be significantly reduced, with the result that costs and the influence on the environment are reduced.

The envisaged area of use of the method according to the disclosure relates to autonomous field robots or intelligent mounted implements for tillage and plant protection in the growing of vegetables, horticulture and arable farming. In principle, the neural networks described above can also be used in other areas in which unknown objects may be present which, however, are to be classified by a classifier.

The invention claimed is:

1. A method for processing plants in a field in which a specific useful plant is grown, using a processing tool, the method comprising:
   capturing an image of the field, the image being correlated with position information;
   determining a position of a plant to be processed in the field using a neural network, into which the captured image is input, the neural network having a plurality of specific classes and a general class, the useful plant belonging to a specific class of the plurality of specific classes, plants which do not correspond to the specific useful plant each belonging one of (i) to both a respective specific class of the plurality of specific classes and the general class and (ii) to at least to the general class;
   guiding the processing tool to the position of the plant; and
   processing the plant using the processing tool.

2. The method as claimed in claim 1, wherein the plants which do not correspond to the specific useful plant are annotated both with the respective specific class and with the general class in training data for an initial training of the neural network.

3. The method as claimed in claim 2, wherein a cost function is adapted during the initial training with the training data such that no costs are generated for a case where a plant which does not correspond to the useful plant, for which a specific class of the plurality of specific classes is defined, is classified as being associated with the general class.

4. The method as claimed in claim 1, wherein the plants which do not correspond to the specific useful plant are annotated with the general class in training data for a subsequent training of the neural network.

5. The method as claimed in claim 4, wherein the training data for the subsequent training of the neural network are acquired in a region of the field in which no useful plants are present.

6. The method as claimed in claim 4, wherein, during the subsequent training with the training data, a cost function is adapted to the subsequent training such that no costs are generated for a case where a plant which belongs to the general class is classified as being associated with a specific class of the plurality of specific classes.

7. The method as claimed in claim 1, wherein the plant to be processed is a useful plant.

8. The method as claimed in claim 1, wherein the plant to be processed includes one of (i) a plant from one specific class of the plurality of specific classes, (ii) multiple plants from multiple specific classes of the plurality of specific classes, and (iii) a plant from the general class.

9. A controller for controlling a processing tool for processing plants in a field in which a specific useful plant is grown, the controller being configured:
   receive a captured image of the field, the image being correlated with position information;
   determine a position of a plant to be processed in the field using a neural network, into which the captured image is input, the neural network having a plurality of specific classes and a general class, the useful plant belonging to a specific class of the plurality of specific classes, plants which do not correspond to the specific useful plant each belonging one of (i) to both a respective specific class of the plurality of specific classes and the general class and (ii) to at least to the general class; and
   output a control signal for controlling the processing tool in order to process the plant.

10. An agricultural work machine comprising:
   a processing tool configured to process plants in a field in which a specific useful plant is grown; and
   a controller comprising a control unit as claimed in claim 9 configured to:
   receive a captured image of the field, the image being correlated with position information;
   determine a position of a plant to be processed in the field using a neural network, into which the captured image is input, the neural network having a plurality of specific classes and a general class, the useful plant belonging to a specific class of the plurality of specific classes, plants which do not correspond to the specific useful plant each belonging one of (i) to both a respective specific class of the plurality of specific classes and the general class and (ii) to at least to the general class; and
   output a control signal for controlling the processing tool in order to process the plant.

* * * * *